United States Patent [19]
van Gennip et al.

[11] Patent Number: 4,744,998
[45] Date of Patent: May 17, 1988

[54] PROCESS FOR THE MANUFACTURING OF CHEESE AND CHEESELIKE PRODUCTS

[75] Inventors: Adrianus H. M. van Gennip, Boxtel; Carolus G. M. van der Sommen, Gemert; Johannes van Pijkeren, Veghel, all of Netherlands

[73] Assignee: DMV-Campina B.V., Veghel, Netherlands

[21] Appl. No.: 596,613

[22] Filed: Apr. 4, 1984

[51] Int. Cl.⁴ ............................................. A23C 20/02
[52] U.S. Cl. ..................................... 426/582; 426/580
[58] Field of Search ............... 426/582, 585, 657, 580, 426/512, 519, 522, 36, 267, 74, 289, 295, 334, 648, 649

[56] References Cited

U.S. PATENT DOCUMENTS

| 1,936,872 | 11/1933 | Frederiksen | 426/582 |
| 3,502,481 | 3/1970 | Schaap | 426/582 |
| 4,075,360 | 2/1978 | Rule et al. | 426/582 |
| 4,547,386 | 10/1985 | Chambers | 426/583 |

FOREIGN PATENT DOCUMENTS

| 0981521 | 1/1976 | Canada | 426/582 |
| 1022382 | 12/1977 | Canada | 426/582 |
| 2342299 | 4/1975 | Fed. Rep. of Germany | 426/582 |
| 0649393 | 2/1979 | U.S.S.R. | 426/582 |

Primary Examiner—Raymond N. Jones
Assistant Examiner—Carolyn Paden
Attorney, Agent, or Firm—Scully, Scott, Murphy & Presser

[57] ABSTRACT

A process for manufacturing cheese and cheeselike products is disclosed wherein a warm emulsion is used which contains water, fat, milk protein or protein derived from milk, and optionally other ingredients. The emulsion is well mixed, pasteurized, cooled, stiffened and formed into shaped pieces. According to the invention, said protein is used in a soluble form and said shaped pieces are treated with calcium ions. For many purposes a soluble paracaseinate is useful as protein.

16 Claims, No Drawings

PROCESS FOR THE MANUFACTURING OF CHEESE AND CHEESELIKE PRODUCTS

The present invention relates to a process for the manufacturing of cheese and cheeselike products. In the manufacturing of cheese, milk from cows or other mammals such as goats and sheep is curdled by treatment with rennet, by acidulation with lactic acid bacteria or by addition of edible organic acids or even mineral acids of food grade, whereafter the thus obtained curd is pressed in moulds, salted or brined and usually subjected to a ripening process wherein the desired aroma is developed and which ripening process may extend over a period of several months. When curdling is performed by means of renner most often calcium chloride is added to the milk prior to the addition of the rennet.

The curdling takes places in the following steps:

1. splitting of the kappa-casein into paracasein and glycomacropeptide by the action of the chymase, the enzyme in the rennet,
2. flocculation of the paracasein together with the other caseins present in the milk under influence of the calcium ions.

So the milk is devided in a curd mass and whey. A part of the whey is immediately separating from the curd but another part has to be removed by the pressing in which the curd is given its desired shape. Curd prepared in other ways is likewise formed in moulds in order to obtain the desired shape and to remove the rest whey.

Disadvantages of the traditional cheese making are the complicated manufacturing process and the relative long processing time.

From milk isolated proteins or derivatives thereof are used in the preparation of some types of cheese imitations.

In the manufacturing of these types of products a warm emulsion is made from the protein, a suitable fat composition, water and salts. In this emulsion the desired flavoring agents and coloring agents are introduced imparting the product the desired aroma and colour. The protein may be present in such a product as calcium caseinate. The disadvantage of the use of calcium caseinate however is that the working method is very critical regarding to process conditions and raw material properties, e.g. the emulsion tends to break. The use of alkali caseinates, e.g. sodium caseinate, makes the adjusting of the process conditions less critical but is resulting in a product displaying a rubbery character when it is eaten.

U.S. Pat. No. 4,075,360 describes the preparation of imitation mozzarella cheese using a cheese formulation which consist of about 15–35% edible protein which includes 70–100% sodium caseinate and up to about 30% calcium caseinate, about 0.5–1.0% of a calcium providing substance other than a calcium protein salt, about 45–30% water, up to about 3% organic emulsifying agent, about 0.2–3% of an edible acid, and about 15–30% of a vegetable oil, where in first a water mixture and an oil mixture are separately prepared, the two mixtures are combined at a temperature of about 130°–172° F., the acid is added, the final mixture is thoroughly stirred at a temperature of about 135°–170° F., whereafter the mixture is cooled until a hardened product is obtained.

Although this method describes a good method for the preparing of imitation mozzarella cheese, it does not suit for the producing of other types of imitation cheeses.

It has now been found that cheese and cheeselike products may be manufactured avoiding the above mentioned disadvantages.

Furthermore the invention makes it possible to manufacture cheese and cheeselike products in a faster way than the traditional way permits.

Cheese and cheeselike products are manufactured according to the present invention by preparing an emulsion at a raised temperature of water, a suitable fat composition, milk protein or a protein derived from milk and other ingredients, if desired, such as ingredients imparting colour and aroma to the product wherein the milk protein or protein derived from milk is used in a soluble form, the emulsion is well mixed, pasteurized, cooled, stiffened, formed to shaped pieces whereafter these pieces are treated with calcium ions.

Good results are obtained with alkali caseinates, e.g., sodium caseinate, potassium caseinate and ammonium caseinate.

The warm emulsion may be cooled and stiffened in a continuous stream, milled and saltened with a dry salt composition containing a calcium ion donor whereafter the saltened curd is pressed in moulds. The warm emulsion may also be poured out in moulds, cooled in the moulds whereafter the shaped bodies are treated in a solution containing calcium ions, or treated in a brine bath containing calcium ions or a calcium ion donor, thus a simultaneous saltening and treating with calcium ions is occurring.

It has been found that these particular ways of incorporating calcium ions into the protein matrix of cheese or cheeselike products allow the manufacture of different kinds of desirable cheese structures without the risks of destabilization during the preparation of the emulsion. It has also been found that the use of soluble paracaseinates in a process according to the present invention makes it possible to obtain a further number of different kinds of cheese structures.

EXAMPLE I

Manufacture of Imitation American Cheese

A mixture was made of
42.2 kg water
7.8 kg soybean oil
19.3 kg coconut oil
28.6 kg EM 7 = Roller dried sodium caseinate (DMV)
0.35 kg citric acid
0.75 kg colouring agent
1.00 kg flavouring agent As colouring agent was used a suspension of 0.04% beta-carotene in groundnut oil, and as flavouring agent a natural cheese flavour. The carefully mixed composition was heated to 90° C. and kept at this temperature for 2 minutes and then moulded into blocks of 20×10×10 cm which were cooled to 20° C., after which the moulded blocks were treated with a brine solution containing 200 g common salt and 8 g of calcium chloride per liter and having a pH value of 5.4 for 72 hours at a temperature of 15° C.

EXAMPLE II

Manufacture of Imitation American Cheese

A mixture was made of
42.2 kg water
7.7 kg groundnut oil 19.0 kg coconut oil
28.4 kg Spraydried sodium caseinate
0.75 kg common salt
0.20 kg citric acid
0.75 kg colouring agent
1.00 kg flavouring agent The colouring agent and the flavouring agent were the same as in Example I. The mixture was treated in the same manner but the brine solution was now containing only 80 g of common salt besides 8 g of calcium chloride and having a pH-value which was adjusted at 5.0 by means of lactic acid.

EXAMPLE III

Manufacture of hard cheese treated in a brine bath

An amount of sodium paracaseinate of 3.45 kg was mixed with 4.20 kg butter oil and 7.65 kg water by means of a Stephan emulsifier heated by means of steam. The emulsion was adjusted to 85° C. by indirect heating, and kept at that temperature for 2 minutes. The pasteurized emulsion was subsequently poured into moulds and cooled to about 15° C., whereafter the solidified emulsion was brined. The brine was containing 190 g of common salt and of 8 g of calcium chloride per liter. The pH was 4.8 to 4.9. Small pieces of cheese (about 75 g) had the desired structure up to heart of the cheese after a residence time in the brine bath as short as 3 hours; larger sizes (about 1,750 g) required a brining period of 48 hours; with larger cheeses the brining period increased to 96 hours.

A Gouda-type cheese thus produced had a protein content of 23%, a fat content of 28%, and moisture content of 45%.

EXAMPLE IV

Manufacture of cheese, using the dry salting method

An emulsion was prepared from 3.90 kg sodium paracaseinate, 6.15 kg water and 4.95 kg butter oil by means of a Stephan emulsifier. The emulsion was heated to 80° C., and kept at that temperature for 3 minutes. After this pasteurization, the emulsion was cooled to 10° C., after which the stiffened mass was milled. The milled curd was salted by adding 15 g salt mixture/kg curd. This mixture consisted of 16 parts by weight of common salt and 1 part by weight of calcium chloride. The salted curd was transferred to cheese moulds of the conventional type for making cheddar cheese, whereafter the cheese was pressed. There was thus obtained a young cheese of the cheddar type containing 35% moisture, 33% milk fat and 26% protein.

We claim:

1. A process for the manufacture of imitation cheese products in the absence of emulsification salts from an admixture comprising water, fat and a soluble protein derived from milk and selected from the group consisting of paracaseinate and a paracaseinate-containing protein and one or more of acidulents, colorants and flavoring agents,
    the amount of ingredients in said admixture being sufficient that it is in a pourable condition at pasteurization temperatures therefor and in a solidifiable form at a lower temperature, which comprises,
    preparing a well mixed emulsion from the admixed materials,
    pasteurizing said emulsion,
    cooling and solidifying said pasteurized emulsion into shaped pieces, and
    treating said shaped pieces with calcium ions to transform the solidified mass into a product having a cheeselike appearance and texture by said treating.

2. A process according to claim 1, wherein the protein derived from milk is an alkali caseinate.

3. A process according to claim 1 wherein the protein derived from milk is sodium caseinate.

4. A process according to claim 1 wherein the protein derived from milk is ammonium caseinate.

5. A process according to claim 1 wherein the steps of preparing, pasteurizing, and cooling and solidifying the emulsion are conducted in a continuous manner and the solidified emulsion is formed into pieces by milling prior to said treatment with said calcium ions.

6. A process according to claim 5 wherein said treating of said shaped pieces with calcium ions is conducted by treating said shaped pieces with a dry salt composition containing 93 to 95% by weight of common salt and 5 to 7% by weight of calcium chloride.

7. A process according to claim 1 wherein said treating of said shaped pieces with said calcium ions is conducted in a brine bath containing common salt and a calcium compound adapted to provided said calcium ions.

8. A process according to claim 7 wherein said brine bath comprises 70 to 250 grams of common salt and 5 to 9 grams of calcium chloride per liter thereof.

9. The process according to claim 1 wherein the soluble protein derived from milk is alkali paracaseinate.

10. The process according to claim 1 wherein the soluble protein derived from milk is sodium paracaseinate.

11. The process according to claim 1 wherein the soluble protein derived from milk is ammonium paracaseinate.

12. A process according to claim 1 wherein the steps of preparing, pasteurizing, and cooling and solidifying the emulsion are conducted in a continuous manner and the solidified emulsion is formed into pieces by milling prior to said treatment with said calcium ions.

13. A process according to claim 12 wherein said heating of said shaped pieces with calcium ions is conducted by treating said shaped pieces with a dry salt composition containing 93 to 95% by weight of common salt and 5 to 7% by weight of calcium chloride.

14. A process according to claim 1 wherein said pasteurized emulsion is shaped in moulds and the resulting shaped pieces are treated in a solution containing said calcium ions.

15. A process according to claim 1 wherein said treating of said shaped pieces with said calcium ions is conducted in a brine bath containing common salt and a calcium compound adapted to provide said calcium ions.

16. A process according to claim 15 wherein said brine bath comprises 70 to 250 grams of common salt and 5 to 9 grams of calcium chloride per liter thereof.

* * * * *

UNITED STATES PATENT AND TRADEMARK OFFICE
CERTIFICATE OF CORRECTION

PATENT NO. : 4,744,998
DATED : May 17, 1988
INVENTOR(S) : Adrianus H. M. Van Gennip, et al.

It is certified that error appears in the above-identified patent and that said Letters Patent is hereby corrected as shown below:

Column 1, line 16: "renner" should read as --rennet--

Column 4, line 28, Claim 7: "provided" should read as --provide--

Signed and Sealed this

Twenty-fifth Day of October, 1988

Attest:

DONALD J. QUIGG

Attesting Officer

Commissioner of Patents and Trademarks